United States Patent
Pomerantz et al.

(10) Patent No.: US 6,178,243 B1
(45) Date of Patent: Jan. 23, 2001

(54) USER-CONTROLLED DOCUMENT PROCESSING

(75) Inventors: Itzhak Pomerantz, Kfar Sava; Emanuel Menczer, Hod Hasharon; Ram Cohen, Tel Aviv, all of (IL)

(73) Assignee: Aliroo LTD, Kfar Sava (IL)

( * ) Notice: Under 35 U.S.C. 154(b), the term of this patent shall be extended for 0 days.

(21) Appl. No.: 09/032,293

(22) Filed: Feb. 27, 1998

(30) Foreign Application Priority Data

| Aug. 27, 1995 | (IL) | 115079 |
| Sep. 12, 1995 | (IL) | 115277 |
| Nov. 30, 1995 | (IL) | 116218 |

(51) Int. Cl.[7] .................................................. H04N 1/44
(52) U.S. Cl. ......................... 380/243; 358/296; 705/78; 382/159; 380/212
(58) Field of Search ................. 380/243, 212; 705/8; 382/159; 358/296

(56) References Cited

U.S. PATENT DOCUMENTS

| 4,350,844 | 9/1982 | Sturzinger et al. | 178/22.18 |
| 4,947,346 | 8/1990 | Kamiya | 364/521 |
| 5,157,763 | 10/1992 | Peters et al. | 395/157 |
| 5,208,853 | 5/1993 | Armbruster | 380/4 |
| 5,212,784 | 5/1993 | Sparks | 395/575 |
| 5,237,614 | 8/1993 | Weiss | 380/23 |
| 5,267,313 | 11/1993 | Hirata | 380/21 |
| 5,313,564 | 5/1994 | Kafri et al. | 395/101 |
| 5,319,705 | 6/1994 | Halter et al. | 380/4 |
| 5,321,749 | * 6/1994 | Virga | 380/18 |
| 5,388,158 | 2/1995 | Berson | 380/23 |
| 5,392,386 | 2/1995 | Chalas | 395/155 |
| 5,398,283 | 3/1995 | Virga | 380/18 |
| 5,473,691 | * 12/1995 | Menezes et al. | 380/25 |
| 5,504,818 | 4/1996 | Okano | 380/49 |
| 5,509,072 | * 4/1996 | Miura | 380/18 |
| 5,535,277 | * 7/1996 | Shibata et al. | 380/28 |
| 5,584,023 | 12/1996 | Hsu | 395/620 |

FOREIGN PATENT DOCUMENTS

| 0650129 | 4/1995 | (EP) | G06F/17/21 |
| 2192744 | 1/1988 | (GB) | G06F/7/00 |
| 060095591 | 4/1994 | (JP) | G09C/1/00 |
| WO 94/07326 | 3/1994 | (WO) | H04N/1/44 |

OTHER PUBLICATIONS

Pete Loshin, "Personal Encryption", Academic Press, p. 373–378, Jan. 1998.*
Robert Elden Wilson, Ph.D., "PGPClick" web site,, version 3.5, Jan. 1995.*
PR Newswire, "Pretty Good Privacy Announces Availability of New Personal Privacy Freeware" Jul. 1997.*

* cited by examiner

Primary Examiner—Thomas R. Peeso
Assistant Examiner—Todd Jack
(74) Attorney, Agent, or Firm—Ladas & Parry

(57) ABSTRACT

A system and method for selectable encryption of documents employing a document generator and a user-controlled document encryptor operative to encrypt user-selector portions of a document generated on document generator.

20 Claims, 8 Drawing Sheets

This clause is a part of a document. Only the next five words `are going to be encrypted` The user selects them using "cut" and "paste" tools which are included in most popular word processors.

FIG. 3A

This clause is a part of a document. Only the next five words `qasw gsgsdfg dgdsf sdljk kj` The user selects them using "cut" and "paste" tools which are included in most popular word processors.

FIG. 3B

This clause is a part of a document. Only the next five words [~~> USE KEY NO. 17 <~~]  >>>>>KE `qasw gsgsdfg dgdsf sdljk kj sdljk kj` <<<<< The user selects them using "cut" and "paste" tools which are included in most popular word processors.

FIG. 3C

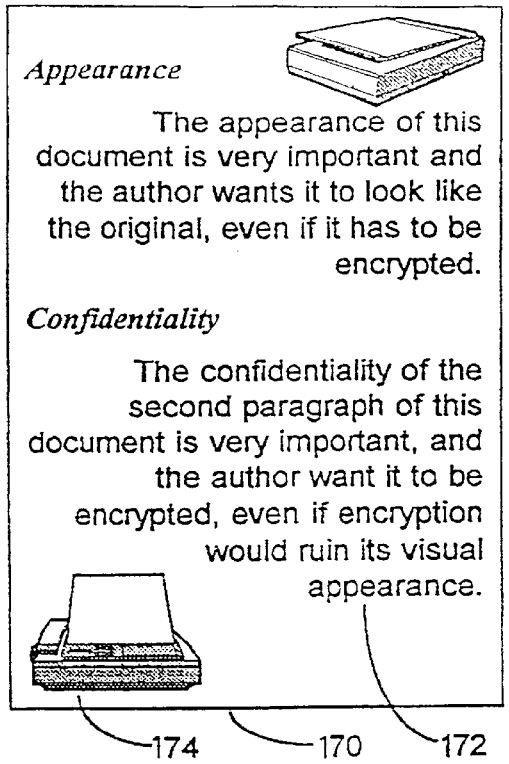
FIG. 5A
FIG. 5B
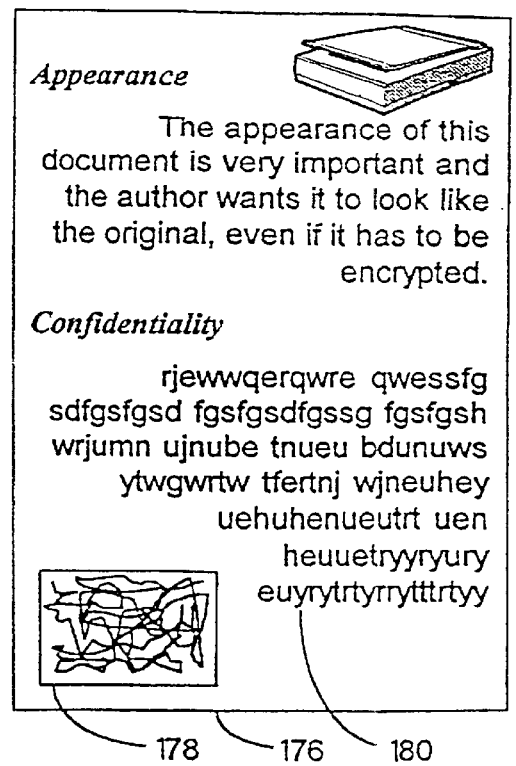

190 192

This is a short example of a document text that contains control characters.

FIG. 6A

\rtlch\ltrch This is a short {\rtlch \ab\af6 \ltrch \b example\rtlch\ltrch } of a
document text that {\rtlch \af6\aul \ltrch \ul contains\rtlch\ltrch }
control characters\rtlch\ltrch .\rtlch\ltrch  \rtlch\ltrch

\rtlch\ltrch qwrrrwer werw wer{\rtlch \ab\af6 \ltrch \b 8dfwkpl \rtlch\ltrch }
wqhnbynytrynertyneryn {\rtlch \af6\aul \ltrch \ul sl[pfjux \rtlch\ltrch }
yertwrwttyjhjfjjj \rtlch\ltrch .\rtlch\ltrch  \rtlch\ltrch

197

FIG. 6C qwrrrwer werw wer 8dfwkpl wqhnbynytrynertyneryn sl[pfjux yertwrwttyjhjfjjj.

198    FIG. 6D    199

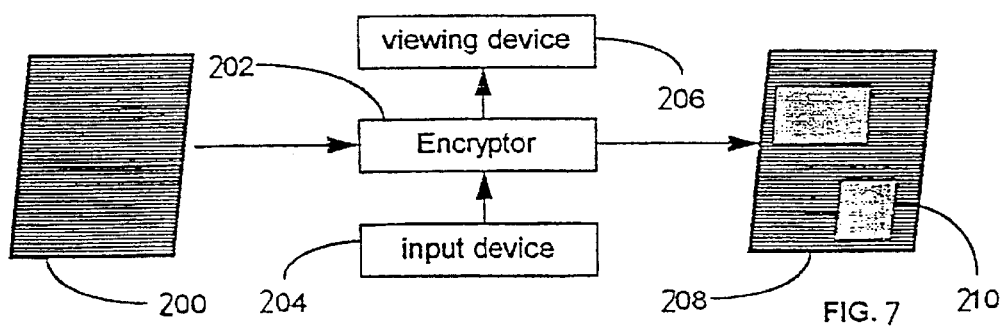

FIG. 7

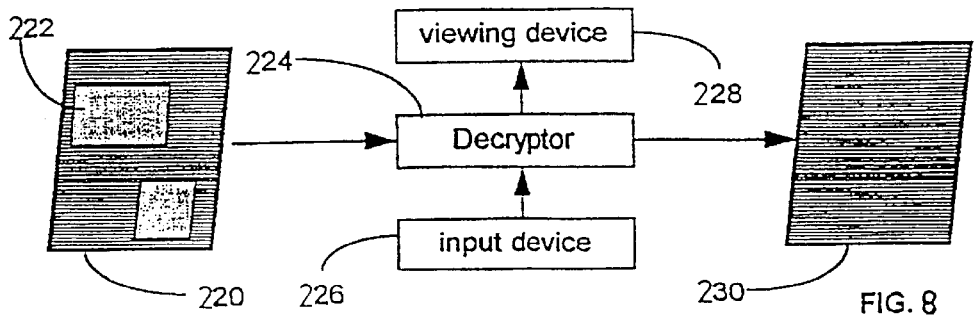

FIG. 8

USER-CONTROLLED DOCUMENT PROCESSING

FIELD OF THE INVENTION

The present invention relates to document processing generally and more particularly to document processing which is protected against unauthorized access.

BACKGROUND OF THE INVENTION

Problems of security in information transmission have been addressed in various ways in the prior art. Various types of encryption techniques are presently used to provide desired levels of security for information transmission and to prevent unauthorized access thereto or modification thereof Protecting the security of documents at the time and location of their creation has not been addressed in the same manner. Generally, security of documents generated using electronic apparatus is ensured by physical security of the electronic apparatus. Thus computers or the storage media thereof are maintained in physically secure installations.

Ensuring the security of documents in environments wherein maintenance of the computers or the storage media in physically secure installations is impractical appears to be a problem still awaiting a solution.

Various techniques are known for protection of communications against unauthorized access. Scrambling and various other forms of encryption are commonly employed for this purpose. Generally, an entire file is protected in this way.

There is described in applicant/inventor's pending PCT patent application, PCT/US94/08684 an apparatus and method for creating and transmitting confidential documents, the disclosure of which is hereby incorporated by reference. Disclosed inter alia in this document is the encryption of only part of a document, wherein the header of the document is left unencrypted.

In computer operating systems and methods it is common for a user carrying out a first process to trigger the operation of a second process. The trigger is typically the entry of a predetermined command which can be achieved using a conventional keyboard or mouse.

Designing the trigger is relatively straightforward when the programmer has access to the first process and is allowed to make changes thereto in order to accommodate the predetermined command.

Increasingly, there are operating environments which are in extremely widespread use, but whose operating commands cannot be accessed and modified in practice by designers of such second processes. Such operating environments may include operating systems, such as WINDOWS, a trademark of Microsoft Corporation, and operating processes, such as WORD 2.0 FOR WINDOWS, a trademark of Microsoft Corporation.

Even when the operating commands can be accessed and modified by designers of such second processes, it is often impractical or uneconomical to do so, since such modifications would require changes such as the creation of new "macros" for each application. There may exist therefore many "non-modified" operating environments for which the present invention is particularly suited.

The present invention concerns triggers operating in non-modified operating environments for enabling a user carrying out a first process to trigger the operation of a second process.

SUMMARY OF THE INVENTION

The present invention seeks to provide a secure document processing system, which preserves the security of documents processed thereby even in the absence of physical security at the location of the system.

There is thus provided in accordance with a preferred embodiment of the present invention, a secure document processing system including a document processor having an input device for inputting information in a non-secure form, an information storage medium associated with the document processor, and encryption apparatus associated with the document processor and with the information storage medium and being operative to encrypt all information received from the document processor prior to storage thereof by the information storage medium in a secure form.

In accordance with a preferred embodiment of the present invention, the system includes automatic encryption and storage apparatus which automatically encrypts and then stores information inputted by the input device periodically in order not to lose said information upon cessation of the supply of electrical power to the document processor. This cessation may be intentional or unintentional.

Additionally in accordance with a preferred embodiment of the present invention, the system includes automatic encryption and storage apparatus which automatically encrypts and then stores information inputted by the input device upon interruption of information input for at least a predetermined time. Such interruption is normally indicative of the possible absence or lack of attention of the user.

There is also provided in accordance with a preferred embodiment of the present invention a secure document processing system including a document processor having an input device for inputting information in a non-secure form, an information output device associated with the document processor, and encryption apparatus associated with the document processor and with the information output device and being operative to encrypt all information received from the document processor prior to output thereof by the information output device in a secure form.

In accordance with a preferred embodiment of the present invention, the system includes automatic encryption and output apparatus which automatically encrypts and then outputs information inputted by the input device periodically in order not to lose said information upon cessation of the supply of electrical power to the document processor.

Additionally in accordance with a preferred embodiment of the present invention, the system includes automatic encryption and output apparatus which automatically encrypts and then outputs information inputted by the input device upon interruption of information input for at least a predetermined time.

Preferably, the document processor is incapable of storing information in a non-secure form.

The information storage medium may be any suitable information storage medium, such as a magnetic medium. The information output device may be a printer or information transmitter.

There is additionally provided in accordance with a preferred embodiment of the present invention a secure document processing method including generating a document in a non-secure form on a document processor using an input device for inputting information, encrypting all information received from the document processor prior to storage thereof, and storing of the information following encryption thereof on an information storage medium.

In accordance with a preferred embodiment of the present invention, the method includes automatic encryption and storage of information inputted by the input device periodically in order not to lose said information upon cessation of the supply of electrical power to the document processor.

Additionally in accordance with a preferred embodiment of the present invention, the method includes automatic encryption and storage of information inputted by the input device upon interruption of information input for at least a predetermined time.

There is further provided in accordance with a preferred embodiment of the present invention a secure document processing method including generating a document in a non-secure form on a document processor using an input device for inputting information, encrypting all information received from the document processor prior to output thereof, and outputting of the information following encryption thereof on an information storage medium.

In accordance with a preferred embodiment of the present invention, the method includes automatic encryption and outputting of information inputted by the input device periodically in order not to lose said information upon cessation of the supply of electrical power to the document processor.

Additionally in accordance with a preferred embodiment of the present invention, the method includes automatic encryption and outputting of information inputted by the input device upon interruption of information input for at least a predetermined time.

In such cases, no information is retained in a non-secure form at the document processor.

Preferably, the method includes prevention of storage of information in a non-secure form.

The document processor may be a computer, such as a personal computer, equipped with a word and/or graphics processing program.

The present invention also seeks to provide an improved apparatus and method for protecting documents which, it is believed, will have broad application.

There is thus provided in accordance with a preferred embodiment of the present invention a system for selectable encryption of documents including a document generator and a user-controlled document encryptor operative to encrypt user-selected portions of a document generated on the document generator.

In accordance with a preferred embodiment of the invention, the document generator comprises a computer having a word processing functionality and the user-controlled document encryptor comprises a hardware and/or software embodied functionality which enables the user to select portions of the document to be encrypted.

There is also provided in accordance with a preferred embodiment of the present invention a method for selectable encryption of documents including generating a document and encrypting user-selected portions of the document.

There is additionally provided in accordance with a preferred embodiment of the present invention a partially encrypted document produced using the method or the apparatus of the present invention.

In accordance with one embodiment of the present invention, a cut and paste functionality is employed for selecting portions of the document to be encrypted. Alternatively, text delimiters may be employed for selecting portions of the document to be encrypted.

Selection of the portions of the document to be encrypted may be carried out concurrently with generation of the document or after generation thereof. The encryption can take place either on-line or off-line.

In accordance with a preferred embodiment of the present invention, the control characters employed in word processing are not encrypted. Accordingly, the selectably encrypted document may retain the format of the corresponding unencrypted document.

The document may include both text and graphics. The graphics may be encrypted in a bit-map format.

It is appreciated that the present invention is equally applicable to decryption of documents.

The present invention also seeks to provide a mechanism and technique useful in a non-modified operating environment for enabling a user carrying out a first process to trigger the operation of a second process.

There is thus provided in accordance with a preferred embodiment of the present invention a computer system including a first operating process operating in a non-modified operating environment and having at least one operating command which is normally employed only in a given mode in the first operating process, and at least one second operating process, the improvement comprising a trigger for enabling a user operating the first operating process to initiate the second operating process, the trigger comprising said at least one operating command used in a mode other than said given mode.

There is also provided in accordance with a preferred embodiment of the present invention for use in a computer system including a first operating process operating in a non-modified operating environment and having at least one operating command which is normally employed only in a given mode in the first operating process, and at least one second operating process, a method for enabling a user operating the first operating process to initiate the second operating process, the method comprising entering said at least one operating command in a mode other than said given mode.

The invention is particularly suitable for situations wherein the first operating process operates in a non-modified operating environment.

In accordance with a preferred embodiment of the present invention, the first operating process is a text editing process.

Additionally in accordance with a preferred embodiment of the present invention, the given mode is a single, non-repeated entry. Preferably the mode other than the given mode is a sequential repeated entry.

In accordance with a preferred embodiment of the present invention, the at least one operating command is a copy command.

Further in accordance with a preferred embodiment of the present invention the non-modified operating environment is a WINDOWS environment.

The second operating process may be any suitable process, such as a text encryption process described hereinabove. Another suitable second operating process is a spell checking process. The second operating process also could be, for example, a language translation process, a text capitalizing process, a text to speech conversion process or a decryption process.

BRIEF DESCRIPTION OF THE DRAWING

The present invention will be understood and appreciated more fully from the following detailed description, taken in conjunction with the drawings in which:

FIGS. 3A, 3B & 3C illustrate part of a document produced in accordance with one preferred embodiment of the present invention in non-encrypted form and two different selectably encrypted forms respectively;

FIGS. 5A and 5B illustrate a document containing text and graphics produced in accordance with the present invention in respective non-encrypted and selectably encrypted form;

FIGS. 6A, 6B, 6C and 6D illustrate selectable encryption of a document text that contains control characters;

FIGS. 7 and 8 are simplified block diagram illustrations of user selectable encryption and decryption systems constructed and operative in accordance with a preferred embodiment of the present invention;

DETAILED DESCRIPTION OF A PREFERRED EMBODIMENT

Figure 1:
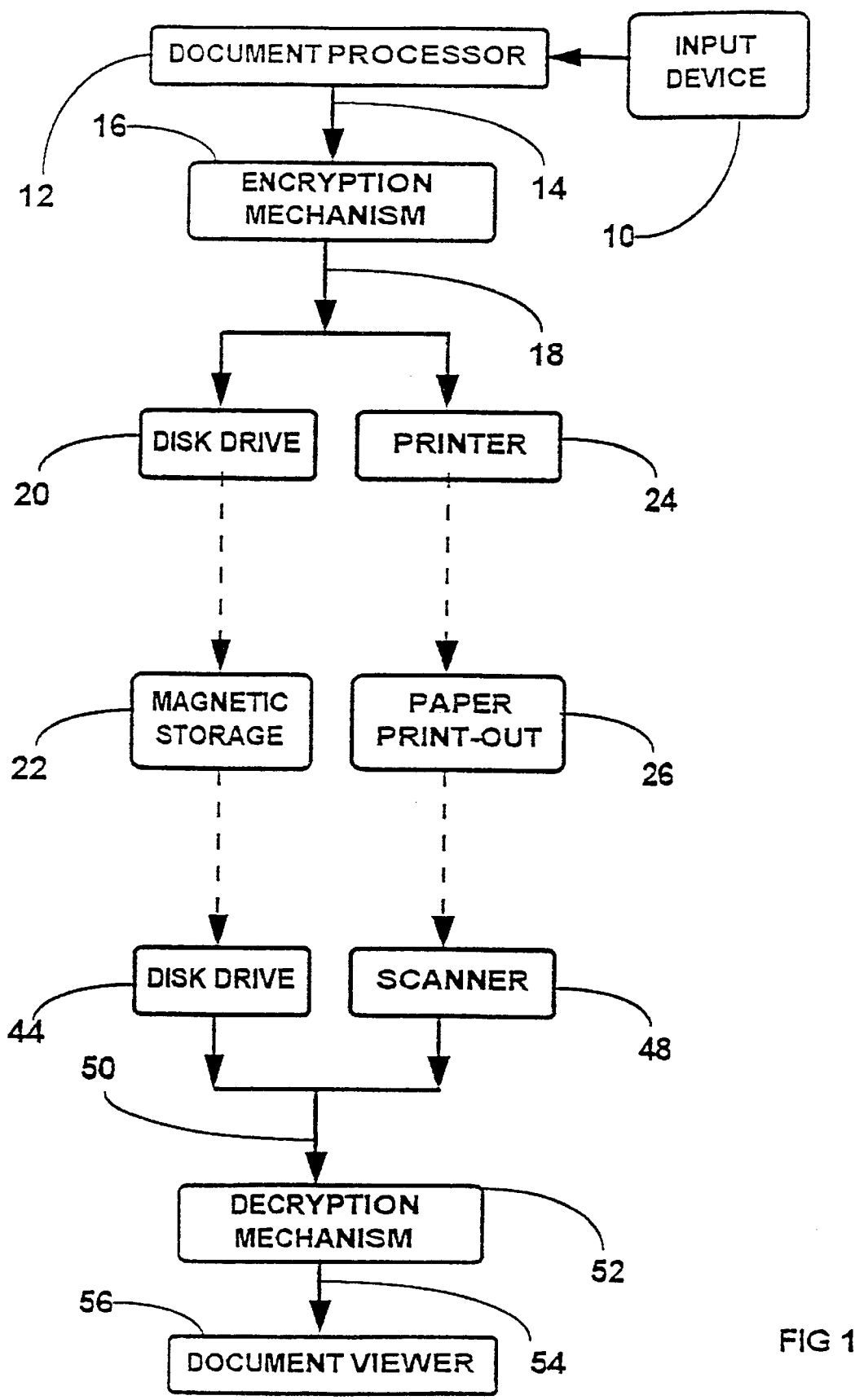
FIG. 1 is a simplified block diagram of a secure document processing system constructed and operative in accordance with a preferred embodiment of the present invention.

Reference is now made to FIG. 1, which is a simplified block diagram of a secure document processing system constructed and operative in accordance with a preferred embodiment of the present invention. An input device 10, such as a keyboard or graphics input device, is employed by an operator to generate a document on a document processor 12 in a non-secure form, such as a human-readable form used in conventional word processors. The document processor may be any suitable computer equipped for word processing.

It is a particular feature of the present invention that the document processor 12 is incapable of preserving the contents of the document in non-secure form beyond the time period when it is actually being generated.

The only information output facility or port of the document processor 12, here indicated by reference numeral 14, is non-removably connected to an encryption mechanism 16 which is operative to encrypt the contents of every document generated on the document processor 12. The encryption mechanism 16 may be any suitable type of encryption mechanism known in the art and commercially available and may provide encryption at any suitable level. A preferred encryption device may be that incorporated in the PrivaSoft (trademark) encryption system commercially available from Aliroo Ltd. of Israel, the present assignee.

The output 14 of the encryption mechanism 16 is connected to a storage medium, typically including a disk drive 20 and magnetic storage apparatus 22. Alternatively or additionally, the output of the encryption mechanism 16 may be supplied to an output device, such as a printer 24 which produces a paper or other hard copy print out 26. The output device may alternatively include an information transmitter, such as fax modem.

It is a particular feature of the present invention that information cannot be transferred from the document processor 12 to the storage media or the output device without first being encrypted.

It is additionally a particular feature of the present invention that the operation of the document processor and the encryption mechanism are such that once their operation is completed, no information in non-secure form remains therein or thereat.

In order to ensure that information in non-secure form is not inadvertently exposed when document processing operation is paused and the document processor is left unattended, the document processor may be programmed so as to provide automatic encryption and subsequent storage and/or outputting of information inputted by the input device upon interruption of information input for at least a predetermined time or upon cessation of the supply of electrical power to the document processor.

In such cases, all the information in non-secure form is eliminated from the document processor and the encryption mechanism. The automatic encryption may employ a key which is provided by the user during document processing. In the absence of such key, the document processor irrevocably erases all information in non-secure form.

The encrypted information which was generated in the document processor may be downloaded from a storage medium such as magnetic storage apparatus 22 using the same or a different disk drive 44. If the encrypted information is in hard copy form, it may be scanned by a scanner 48. In either case, such information can be decrypted at any location by the use of a suitable decryption mechanism 52 and supplied to a document viewer 54 in non-secure, human readable form. Preferably, the decryption mechanism 52 and the document viewer 54 have no information storage or hard copy output capability and are operative only when attended by an authorized user.

Figure 2A:
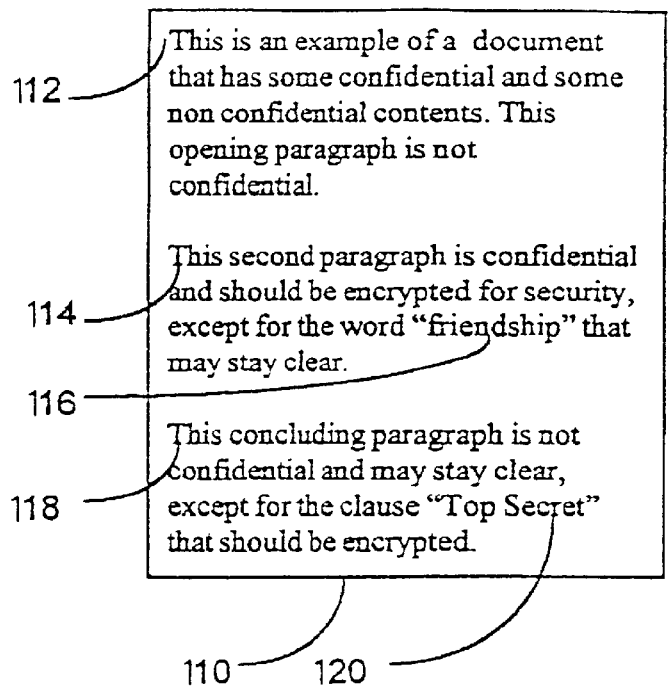
FIGS. 2A and 2B illustrate a document produced in accordance with the present invention in respective non-encrypted and selectably encrypted form.
Figure 2B:
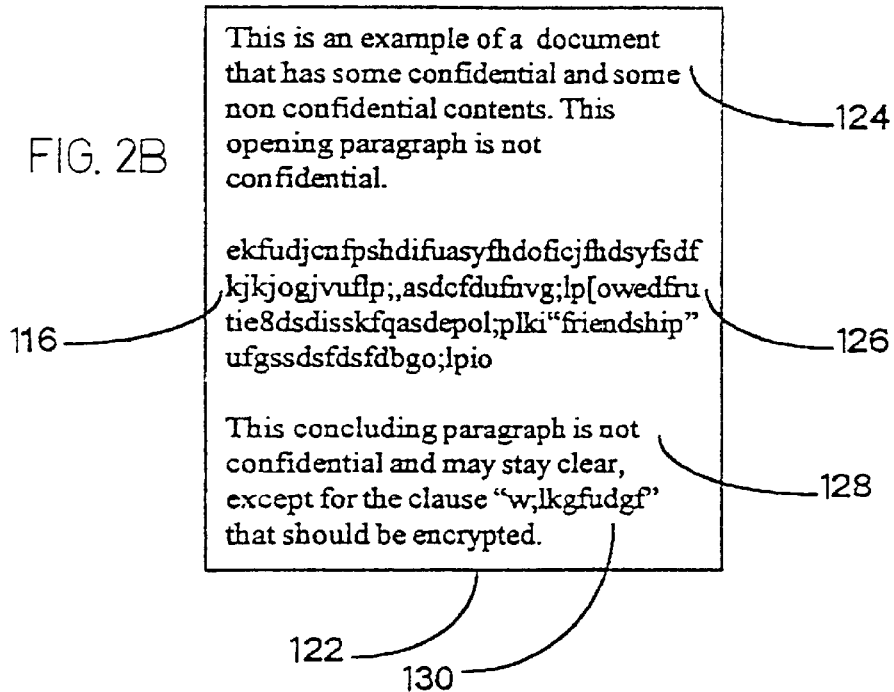

Reference is now made to FIGS. 2A and 2B, which illustrate a document produced in accordance with the present invention in respective non-encrypted and selectably encrypted form, indicated by respective reference numerals 110 and 122. The document may be any suitable document and may be generated in any suitable manner, such as on a conventional PC based word processor.

In accordance with a preferred embodiment of the present invention, a user may select portions of the document which are to be encrypted. For example, paragraph 112 of the document is unencrypted, as indicated at reference numeral 124 in FIG. 2B. Paragraph 114 is encrypted, as indicated at reference numeral 126 in FIG. 2B, with the exception of one word "Friendship", indicated by reference numeral 116 in both FIGS. 2A and 2B.

Paragraph 118 is seen to be unencrypted, as indicated at reference numeral 128 in FIG. 2B, with the exception of one phrase "Top Secret", indicated by reference numeral 120 in FIG. 2A and in its encrypted form in FIG. 2B, by reference numeral 130.

Reference is now made to FIGS. 3A, 3B and 3C, which illustrate part of a document 200 produced in accordance with one preferred embodiment of the present invention in non-encrypted form and two different selectably encrypted forms respectively. Here the segments to be encrypted are selected using a conventional "cut and paste" function which is available in most word processors.

The advantage of this functionality is that the user need not modify the original text and that the segments may be selected for encryption after the document is finished. A disadvantage is that encryption has to be done in real time, segment by segment, because in most word processors only one continuous segment may be "cut" at a time.

FIG. 3A shows a passage with a segment 140 marked for encryption. FIG. 3B shows the same passage with segment 140 encrypted. FIG. 3C shows the identical passage with segment 140 encrypted with the addition of a label section 144 which contains service information such as encryption key identification information or other information which is useful in decrypting the segment or encryptor identification information operative to identify the serial number of the individual encryptor employed to encrypt the segment. Additionally text delimiters 146 and 148 and character data 149 may be provided in the encrypted text to enable automatic decryption.

Character data 149, also referred to as a key extension, is employed in a conventional manner to enhance the robustness of the encryption. It is know that when multiple segments or pages of data are encrypted with the same key, cracking the encryption is made easier. In order to prevent this phenomenon but still require the user to enter only one key per document for decryption, the encryption program generates random characters which constitute a key extension, which characters are employed together with the user-defined encryption key to create a new key which is the actual one used for the encryption. The key extension is inserted in the encrypted document so that the decrypter uses it together with the user defined decryption key in order to reconstruct the key which is used for decrypting the document. The key extension can be recognized automatically or may be inserted manually since it is formed of printable characters inserted into the encrypted document.

Figure 4A:
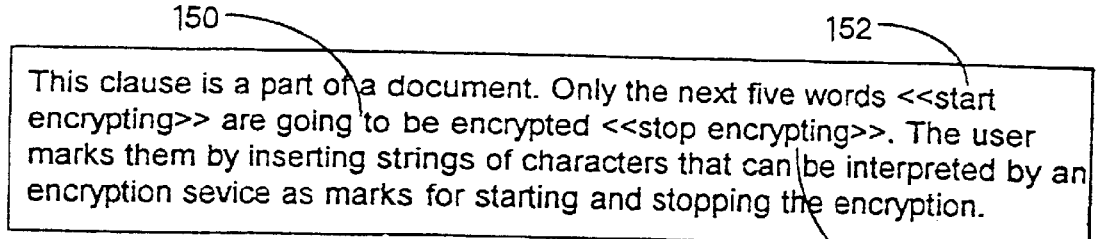
FIGS. 4A, 4B & 4C illustrate part of a document produced in accordance with another preferred embodiment of the present invention in non-encrypted form and two different selectably encrypted forms respectively.
Figure 4B:
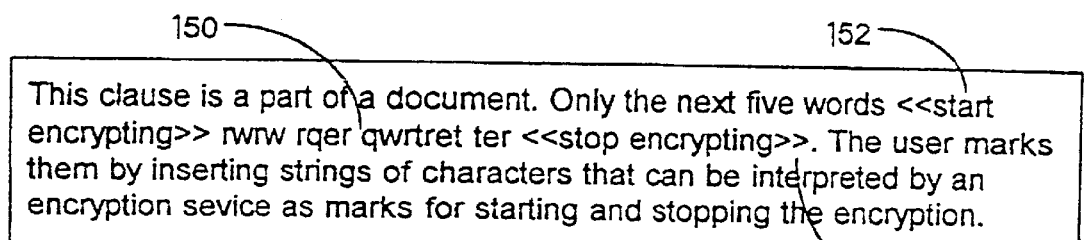
Figure 4C:
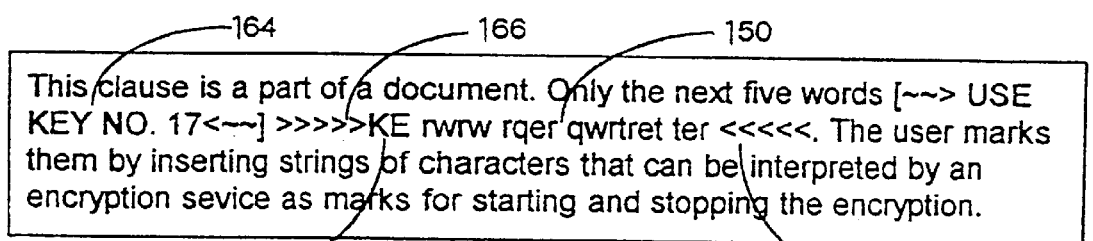

Reference is now made to FIGS. 4A, 4B and 4C, which illustrate part of a document produced in accordance with another preferred embodiment of the present invention in non-encrypted form and two different selectably encrypted forms respectively. Here the segments to be encrypted are selected using text delimiters, also known as control strings.

The advantage of this functionality is that the user can easily instruct the encryptor where to start and where to finish as he writes. Using this functionality, the user can save the file and have it encrypted off-line inasmuch as the text delimiters are part of the saved file.

FIG. 4A shows a passage with a segment 150 marked for encryption by text delimiters 152 and 154. FIG. 4B shows the same passage with segment 150 encrypted. FIG. 4C shows the identical passage with segment 150 encrypted with the addition of a label section 164 which contains service information such as encryption key identification information or other information which is useful in decrypting the segment or encryptor identification information operative to identify the serial number of the individual encryptor employed to encrypt the segment.

Additional text delimiters 166 and 168 and character data 169 may be provided in the encrypted text to enable automatic decryption.

Reference is now made to FIGS. 5A and 5B, which illustrate a document containing text and graphics produced in accordance with the present invention in respective non-encrypted and selectably encrypted form. It is a particular feature of the invention that the overall layout of the document is preserved even when parts thereof are encrypted. It is also a particular feature of the invention that selectable parts of the graphics contained therein can be encrypted by bit map encryption techniques.

Reference is now made to FIGS. 6A, 6B, 6C and 6D illustrate selectable encryption of a document text that contains control characters. In this embodiment, the encryptor recognizes control characters used by a word processor and does not encrypt them. Only the data, i.e. the text typed by the user which is visible on the screen and hard copy, is encrypted. As a result the encrypted document looks exactly like the original. Boldface remains boldface, underlining is unchanged and line justification is intact. The same font and line spacing may be used notwithstanding that the document is wholly or partially encrypted.

FIG. 6A shows the unencrypted document including boldface characters indicated at reference numeral 190 and underlining, indicated at reference numeral 192. FIG. 6B shows the unencrypted document of FIG. 6A together with the control characters which are not normally displayed. FIG. 6C corresponds to FIG. 6B except that the document is encrypted. It is seen that the control characters are not affected by the encryption. FIG. 6D illustrates the encrypted document. It is seen from FIG. 6D that the encrypted document looks exactly like the original. Boldface remains boldface, underlining is unchanged and line justification is intact. The same font and line spacing may be used notwithstanding that the document is wholly or partially encrypted.

Reference is now made to FIGS. 7 and 8, which are simplified block diagram illustrations of user selectable encryption and decryption systems constructed and operative in accordance with a preferred embodiment of the present invention. As seen in FIG. 7, an unencrypted document 200 is supplied to an encryptor 202 having associated therewith an input device 204 and a viewing device 206. It is appreciated that elements 202, 204 and 206 may all be embodied in a suitably programmed personal computer having conventional word processing functionality. The output of encryptor 202 when the functionality described hereinabove is carried out is a user selected partially encrypted document 208 having encrypted portions 210.

Referring to FIG. 8, it is seen that an encrypted document 220, having user selected encrypted portions 222, is supplied to a decrypter 224 having associated therewith an input device 226 and a viewing device 228. It is appreciated that elements 224, 226 and 228 may all be embodied in a suitably programmed personal computer having conventional word processing functionality. The output of decrypter 224, when the functionality described hereinabove is carried out, is a decrypted document 230.

Further embodiments of the present invention will be described in the context of a text-editing program, such as WORD 2.0 FOR WINDOWS, operating in a WINDOWS operating environment. It is to be appreciated that the invention is not limited to text-editing nor to the WINDOWS operating environment.

Figure 9:
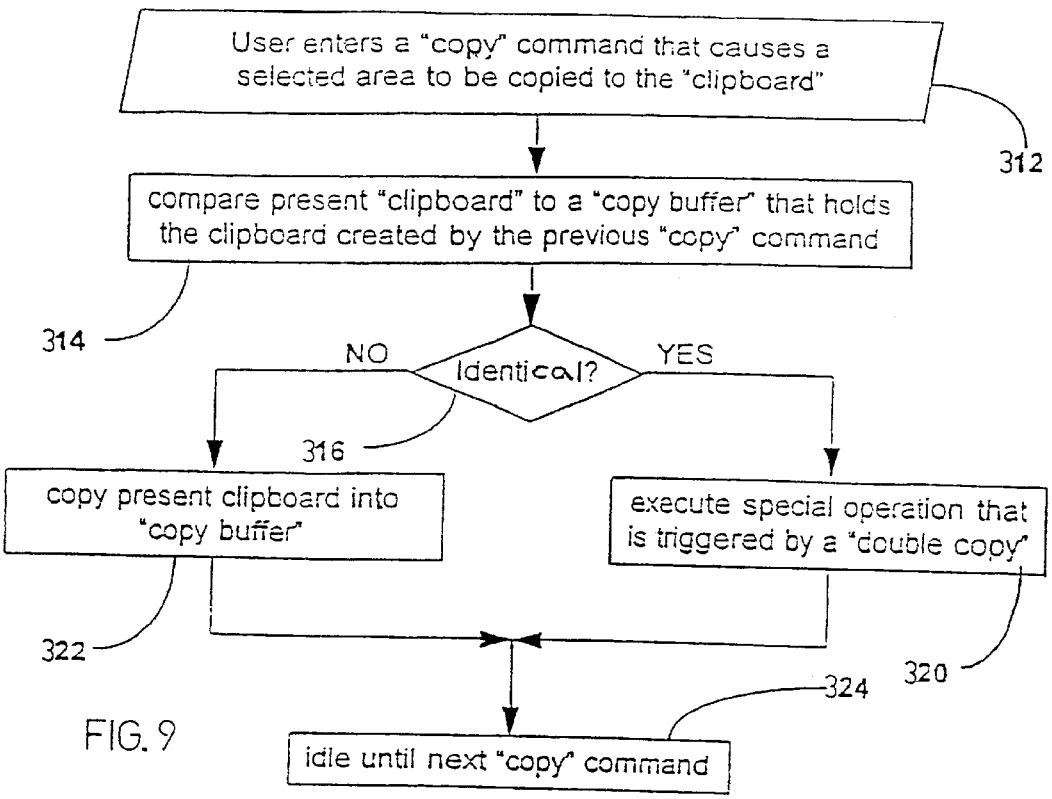
FIG. 9 is a simplified flow chart illustration of the invention.

The method of the invention will now be described with reference to FIG. 9, which illustrates at block 312, definition of a given area of a text and copying thereof into a temporary storage facility, termed a "Clipboard" in WINDOWS, by means of a Copy command.

As indicated at block 314, upon entry of the Copy command, the contents of the Clipboard are compared with the previous contents of the Clipboard, stored in a copy buffer, which were entered by the previous Copy command in order to determine whether two repeated sequential Copy commands were entered without altering the contents of the Clipboard.

As indicated at blocks 316 and 322, if the current contents of the Clipboard are not identical to the previous Clipboard contents, indicating that two repeated sequential Copy commands were not entered, no trigger is recognized and no second process is initiated and the current contents of the Clipboard are copied into the copy buffer.

If the current contents of the Clipboard are identical to the previous Clipboard contents, indicating that two repeated sequential Copy commands were entered, a trigger is recognized, as indicated at block 320, producing a special operation, i.e. a second process.

Figure 10:
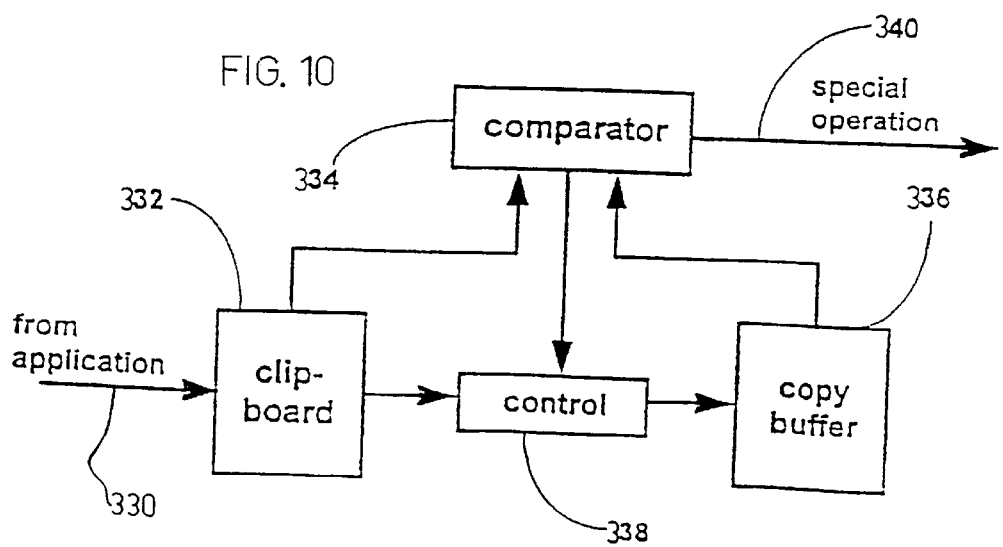
FIG. 10 is a simplified block diagram illustration of the invention.

Referring now to the simplified block diagram of FIG. 10, it is seen that text, indicated by reference numeral 330 is stored in a Clipboard 332. The current contents of the Clipboard 332 are compared by a comparator 334 with the previous contents of the Clipboard, which are stored in a copy buffer 336 under the control of control apparatus 338. The comparator 334, upon sensing a sequential repeat Copy command entry provides an output 340 which initiates a special operation. It is appreciated that the structure of FIG. 10 is normally embodied in software or a combination of hardware and software.

It is to be appreciated that although the invention has been described hereinabove in the context of the use of repeated Copy commands, the invention is not limited to such use and may be applicable to commands other than Copy commands, which may be independent of the Clipboard. Furthermore, although the invention as described hereinabove identifies the trigger by sensing identical Clipboard contents, this criteria need not be the only criteria and may be replaced by any other suitable criteria.

Figure 11:
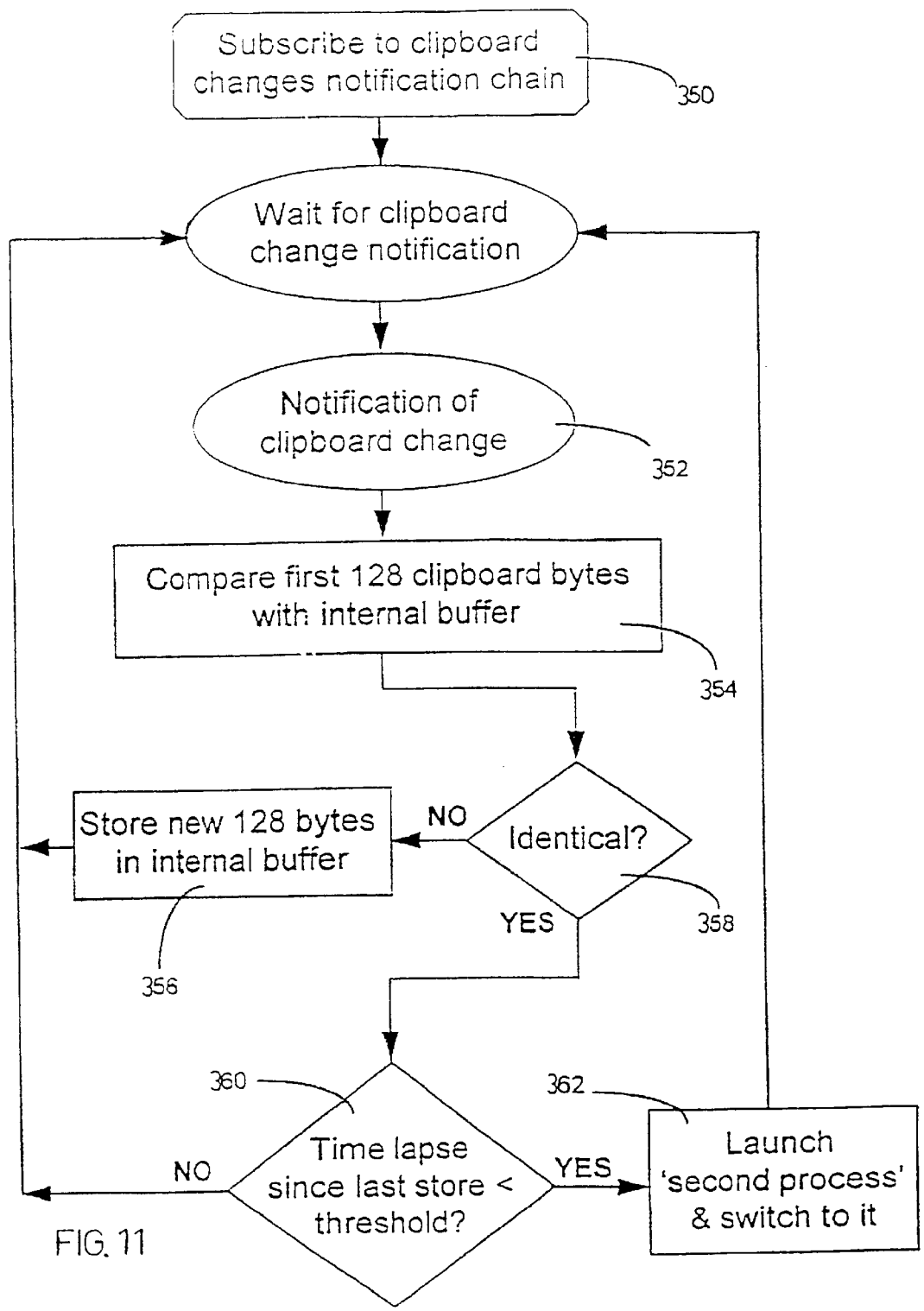
FIG. 11 is a simplified flow chart illustration of a preferred embodiment of the invention.

Reference is now made to FIG. 11, which illustrates the invention in the specific context of a WINDOWS text editing program having "Select", "Copy" and "Paste" commands. Descriptions of the structure of WINDOWS are in the public domain. One useful guide is The Microsoft guide to writing applications for Windows 3.1 by Charles Petzold, 3rd Edition, Published by Microsoft Press, Copyright 1992, the disclosure of which is hereby incorporated by reference.

The "Select" command enables the user to mark a segment of a document. The "Copy" command enables the user to copy the selected segment of the document into the Clipboard, which makes it accessible by another process or program. The "Paste" command enables the user to paste the contents of the Clipboard into any desired place in the document.

In most operating systems, such as WINDOWS, any suitable process can be programmed to be aware of changes made to the contents of the Clipboard by being made a part of a "notification chain" invoked by the operating system each time such a change occurs. Additionally, in most operating systems, such as WINDOWS, any process may access the contents of the Clipboard for reading and/or modifying the contents.

In accordance with a preferred embodiment of the present invention the existing tools of a text editing process, such as that in WINDOWS are employed to initiate another process, such as, for example, text encryption, text translation, text capitalization or text decryption, and to feed a desired segment of text into that second process. In accordance with the preferred embodiment of the present invention, and as described with reference to FIG. 11, the foregoing is accomplished by inspecting and storing the contents of the Clipboard whenever it is updated. If the contents of the Clipboard are found to be related in a predefined manner, such as being identical, to the contents of the Clipboard found upon the previous update, it is determined that the user intended to initiate the second process and the second process is operated.

Further in accordance with a preferred embodiment of the present invention, the contents of the updated Clipboard are employed as input data for the second process.

Additionally in accordance with a preferred embodiment of the present invention, the contents of the Clipboard, following operation of the second process thereon, constitute the output data of the second process.

The preferred embodiment of the invention assumes that inasmuch as it is totally useless for a user, working in the text editing operation, to execute the Copy command twice sequentially on the same portion of the text, it can be safely assumed that by executing the Copy command twice sequentially on the same portion of the text, the user expressed his intention that a second process be initiated.

Additional protection against unintended initiation of the second process can be achieved by limiting actuation of the second process to occurrences where the time duration between two consecutive Copy commands is less than a predetermined time.

Referring now specifically to FIG. 11, it is seen that the trigger operation begins by subscribing to the Clipboard changes notification chain, which is inherent in the WINDOWS chain, as indicated in block 350. Upon being informed of a change in Clipboard contents (block 352), the mechanism and method of the invention compares (block 354) typically the first 128 bytes of data in the Clipboard with those in the copy buffer 336 (FIG. 10). If the contents are not identical, the first typically 128 bytes of data from the new Clipboard are stored in buffer 336 (Blocks 356 and 358). A further Clipboard change notification is awaited.

Preferably, if the contents of the Clipboard are identical to those in buffer 336, a time duration determination is made. If the two sequential Copy commands were given within a given maximum time duration (Block 360), typically one second, the second process is initiated (Block 362). Otherwise, a further Clipboard change notification is awaited.

Following completion of the second process on the text in the Clipboard, a paste operation may be carried out within the first process wherein the modified text from the Clipboard, upon which the second process has operated, is replaced into the text being edited in the first, text editing process.

It is to be appreciated that the second process typically operates automatically but may be interactive and may involve parameter inputs, such as, for example, an encryption key, from the user.

The second process in the above example is a single process. Alternatively it can be multiple processes and include a menu that allows a user to choose between a variety of second processes, such as encryption, decryption, spell checking, translation to other languages and text to speech conversion.

Appended hereto as Appendix A is a program listing of a source code, written in C language, for carrying out the preferred embodiment of the invention described hereinabove.

It will be appreciated by persons skilled in the art that the present invention is not limited by what has been particularly shown and described hereinabove. Rather the scope of the present invention is defined only by the claims which follow:

We claim:

1. A system for selectable encryption of documents including a document generating computer and a user-controlled document encryptor operative to encrypt user-selectable portions of a document generated on the document generating computer, the user-selectable portions being variable from document to document in accordance with user selection.

2. A system according to claim 1 and wherein said document generator computer and user-controlled document encryptor employ a cut and paste functionality for selecting portions of the document to be encrypted.

3. A system according to claim 1 and wherein said document generator computer and user-controlled document encryptor provide an at least partially encrypted document including a plurality of encrypted segments each having associated therewith at least one of a label section which contains service information useful in decrypting the segment, text delimiters and character data to enable automatic decryption of the segment.

4. A system according to claim 1 and wherein said document generator computer and user-controlled document encryptor are operative to permit selection of the portions of the document to be encrypted to be carried out either concurrently with generation of the document or after generation thereof.

5. A system according to claim 1 and wherein said document generator computer and user-controlled document encryptor are operative to avoid encryption of the control characters employed in word processing.

6. A system according to claim 1 and wherein said document generator computer and user-controlled document encryptor are operative to provide a selectably encrypted document which retains the format of the corresponding unencrypted document.

7. A system according to claim 1 and wherein said document generator computer and user-controlled document encryptor are operative to provide a selectably partially encrypted document which includes both text and graphics.

8. A system according to claim 7 and wherein said document generator computer and user-controlled document encryptor are operative to encrypt graphics in a bit-map format.

9. A system according to claim 1 and said document decrypter is operative to automatically decrypt an at least partially encrypted document including a plurality of encrypted segments each having associated therewith at least one of a label section which contains service information useful in decrypting the segment, text delimiters and character data to enable automatic decryption of the segment.

10. A method for selectable encryption of documents including generating a document and encrypting user-selectable portions of document, the user-selectable portions being variable from document to document in accordance with user selection.

11. A method according to claim 10 and including a cut and paste functionality for selecting portions of the document to be encrypted.

12. A method according to claim 10 and being operative to avoid encryption of the control characters employed in word processing.

13. A computer system including a first operating process operating in a non-modified operating environment and having at least one user operating command which is normally employed only in a given mode in the first operating process, and at least one second operating process, which includes encryption the improvement comprising:

a trigger for enabling a user operating the first operating process to initiate the second operating process, the trigger comprising said at least one operating command used in a mode other than said given mode.

14. A system according to claim 13 and wherein the given mode is a single, non-repeated entry.

15. A system according to claim 14 and wherein the mode other than the given mode is a sequential repeated entry.

16. A system according to claim 13 and wherein said at least one operating command is a copy command.

17. A system according to claim 13 and wherein a text encryption process is provided and is operative to encrypt only part of a document.

18. For use in a computer system including a first operating process operating in a non-modified operating environment and having at least one operating command which is normally employed only in a given mode in the first operating process, and at least one second operating process, which is an encryption process, a method for enabling a user operating the first operating process to initiate the second operating process, the method comprising entering said at least one operating command in a mode other than said given mode.

19. A method according to claim 18 and wherein the given mode is a single, non-repeated entry.

20. A method according to claim 19 and wherein the mode other than the given mode is a sequential repeated entry.

* * * * *

UNITED STATES PATENT AND TRADEMARK OFFICE
CERTIFICATE OF CORRECTION

PATENT NO.   : 6,178,243 B1
DATED        : January 23, 2001
INVENTOR(S)  : Itzhak Pomerantz, et al.

It is certified that error appears in the above-identified patent and that said Letters Patent is hereby corrected as shown below:

Title page,
Insert -- Related U.S. Application Data [63] Continuation-in-Part of application No. PCT/IL96/00088, August 26, 1996 --.

Column 1,
Line 3, before "FIELD" insert -- This is a continuation-in-part of copending application serial number PCT/IL96/00088, filed on AUGUST 26, 1996, claims the benefit thereof and incorporates the same by reference. --.

Signed and Sealed this

Thirteenth Day of November, 2001

Attest:

NICHOLAS P. GODICI
*Attesting Officer*    *Acting Director of the United States Patent and Trademark Office*